Figure 1:
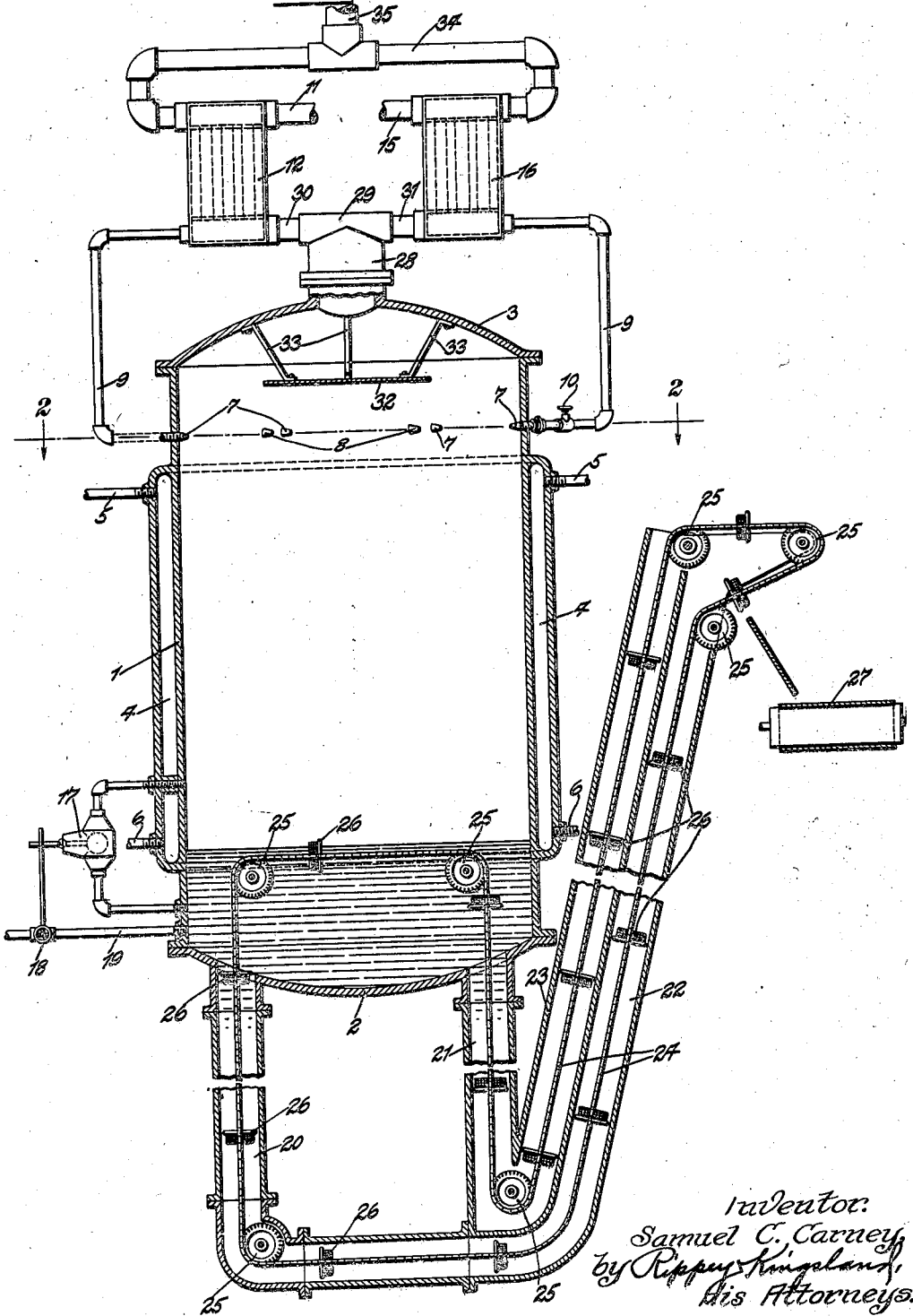

April 22, 1930.  S. C. CARNEY  1,755,810
METHOD OF REFRIGERATION
Filed Oct. 1, 1925   2 Sheets-Sheet 1

Inventor:
Samuel C. Carney
by Rippey Kingland
his Attorneys.

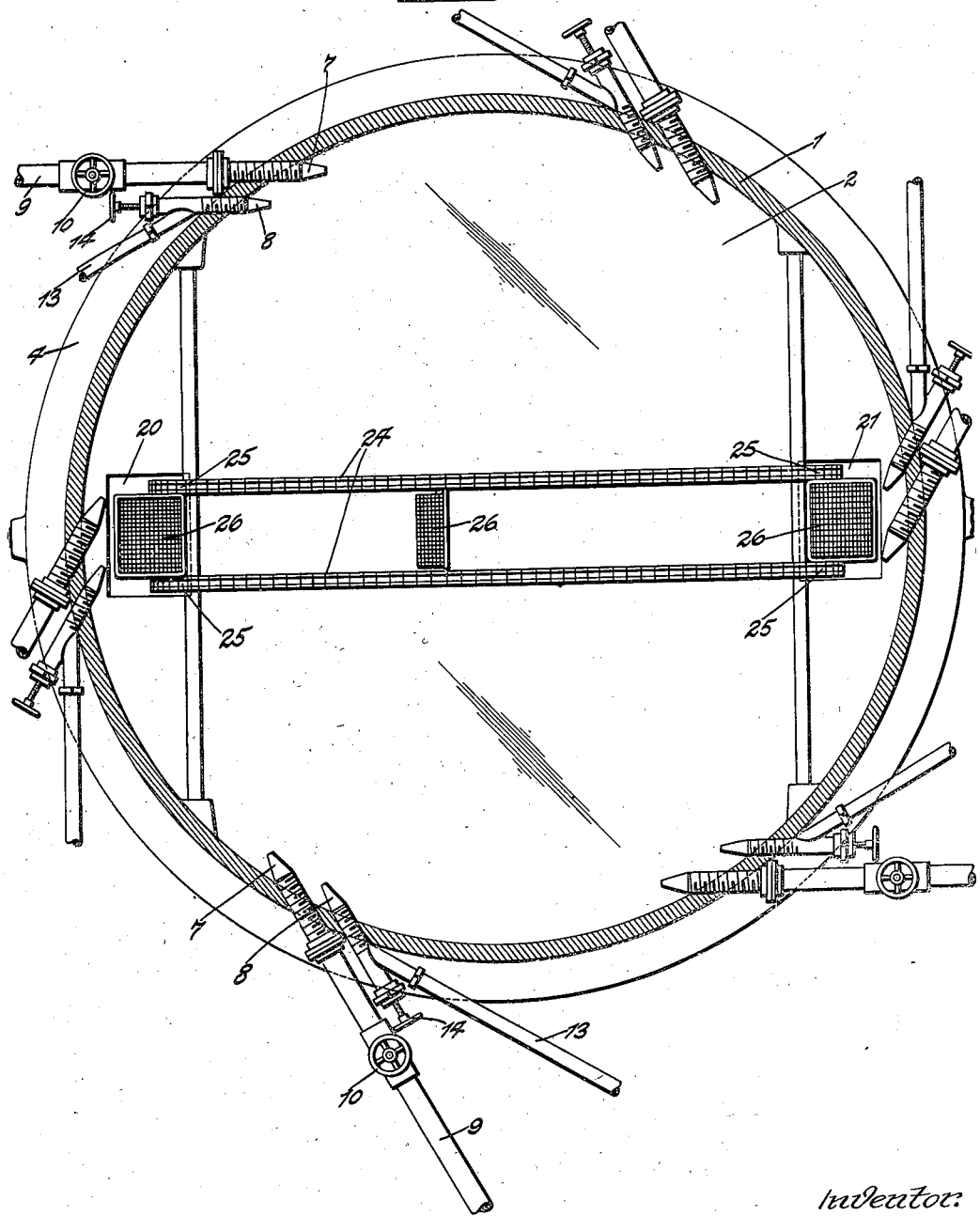

Patented Apr. 22, 1930

1,755,810

UNITED STATES PATENT OFFICE

SAMUEL C. CARNEY, OF TULSA, OKLAHOMA, ASSIGNOR TO SHELL PETROLEUM CORPORATION, A CORPORATION OF VIRGINIA

METHOD OF REFRIGERATION

Application filed October 1, 1925. Serial No. 59,796.

This invention relates to a method of refrigeration.

It has been determined that hydrocarbon mixtures comprising blends of propane, ethane and other similar light hydrocarbons when liquefied and then expanded may be successfully used as refrigerants. It has also been determined that such hydrocarbon blends when maintained under comparatively low pressures are only slightly soluble in water, even at a temperature of approximately 32° F. It has been further determined that such hydrocarbons, particularly the paraffines when pure, have very little taste or odor and are not deleterious or harmful when absorbed internally by human beings.

It is an object of the present invention to provide a method whereby a hydrocarbon refrigerant of the general character above mentioned may be directly brought into contact with water in a chamber in which a reduced pressure is maintained, and thereby freeze the water. It will be understood also that the method has a broad application and that it may be applied for freezing any liquids in which the refrigerant is insoluble, or substantially so; or from which the refrigerant may be readily removed without harm to the liquid with which it comes in contact, for example, heavier petroleum products such as lubricants.

In the drawings there is illustrated one form of apparatus suitable for carrying out the method of the invention, although it will be understood that the invention may be practiced in various other ways. By reference to the following disclosure taken in connection with the accompanying drawing, the advantages as well as the additional applications of the process may be readily understood.

In the drawings, Fig. 1 is a vertical section of the apparatus.

Fig. 2 is a cross section on the line 2—2 of Fig. 1.

The apparatus includes a chamber 1 substantially cylindrical in form having a curved head 2 at the bottom, and a top 3. The side wall of the chamber 1 is provided with a water jacket 4 for keeping the side wall of the chamber at a substantially uniform temperature. The water jacket is supplied with a flow of water through the pipes 5 which is withdrawn through a pipe 6 from which it passes to any suitable suction or feed pump, whereby the circulation of the water in the jacket is maintained. The rate of flow of the liquid in the water-jacket is such that a temperature of slightly above 32° F. will be maintained in the wall of the chamber surrounded by the water-jacket.

Near the top of the chamber 1 there is a series of water nozzles 7 having adjacently arranged thereto a series of refrigerant nozzles 8. The nozzles 7 and 8 are arranged in pairs and spaced at substantially equal intervals circumferentially of the wall of the chamber 1. The nozzles are arranged so that the spray therefrom is directed tangential of the curved inner surface of the chamber 1. The nozzles 7 are connected with water supply pipes 9 controlled by a valve 10, said supply pipes 9 being arranged in communication with a manifold pipe that is supplied with water through a supply pipe 11 that connects into a heat exchanger 12, said heat exchanger being cooled by the vapors passing from the chamber 1, as hereinafter described.

The nozzles 8 are supplied with the liquid refrigerant through pipes 13, the nozzles being controlled by valves 14. The pipes 13 are likewise connected into a manifold and are supplied with the liquid refrigerant through a general supply pipe 15 that passes through a heat exchanger 16, said heat exchanger 16 also being supplied for cooling purposes with the vapors from the chamber. It will be understood that the refrigerant is a liquefied light hydrocarbon blend having a relatively low boiling point, such as propane, ethane or other hydrocarbons of like characteristics. It is also to be understood that while the supply for the water nozzles and for the refrigerant nozzles has been described as passing through heat exchangers, this particular feature is unessential, and the supply may be directed to the nozzles from any suitable source.

The water and refrigerant supply to the nozzles 7 and 8 is so coordinated that there will be a substantial excess of water. The refrigerant is commingled with the water supply from the plurality of nozzles and, as a result of the direct contact of the refrigerant spray with the water spray, a quantity of ice is formed which floats upon the excess accumulation of water in the bottom of the chamber 1.

Provision is made for maintaining a level of water in the bottom of the chamber 1 by equipping the chamber with a liquid level control 17 which operates a valve 18 in a discharge pipe 19 connected into the bottom of the chamber 1, the discharge pipe 19 being connected with any suitable evacuation device, such as a suction pump.

The ice formed floats on the water in the bottom of the chamber and may be conveniently withdrawn therefrom by a conveyer device operating in barometric tubes, one of said tubes 20 being connected into one side of the bottom 2 of the chamber 1, and the other tube 21 being connected into the opposite side of the bottom 2 of the chamber 1. These tubes have extensions 22 and 23, respectively, and are of a length sufficient to balance the reduced pressure maintained in the chamber 1 by the head of water in the tubes. An endless conveyor 24 is arranged in the tubes over a suitable system of pulleys 25 so that, by operation of the conveyor, reticulated buckets 26 constantly traverse the upper surface of the liquid in the bottom of the chamber. The ice bodies floating on the top of the water are thus gathered in the buckets and carried upwardly through the extension 23 and discharged on a conveyor 27 and accumulated at a suitable press for converting them into ice blocks, or carried to a point for use in the form in which they are withdrawn from the chamber.

It will be understood that the pressure in the chamber 1 is maintained substantially below atmospheric and preferably at an absosute pressure of five pounds or less. The pressure is dependent to some degree upon the molecular weight of the refrigerant used. For refrigerants of greater molecular weight it is desirable to maintain a lower pressure.

The principal purpose of maintaining a low pressure in the chamber 1 is to reduce the solubility of the refrigerant in the liquid being frozen. Another result of maintaining a low pressure in the chamber 1 is that at low pressure a substantial evaporation of the water takes place. It will be understood that the greater part of the total pressure in the chamber 1 is due to the vapor of the refrigerant utilized. By reason of this it is possible to evaporate water at an absolute pressure considerably higher than when only water and its vapor are present in the chamber 1. If, for example, propane is used as the refrigant, and an absolute pressure of 150 milli-meters of mercury is maintained in the chamber 1, approximately 9% of the refrigeration will be accomplished by the evaporation of water from and at the temperature of 32° F., maintained by the presence of excess water in the chamber 1.

After the refrigerant has been converted into a vapor it is withdrawn through a passage 28 that has a manifold 29 connected therewith, said manifold having connections 30 and 31 with the heat exchangers 12 and 16, respectively. The outlet into the passage 28 is preferably baffled by a wall 32 supported below the opening by straps 33 extending from the top of the chamber.

The vapor passing through the heat exchangers 12 and 16 serves to precool both the water and the liquid refrigerant. From the heat exchangers 12 and 16 the vapor is withdrawn through a manifold 34 that has a pipe 35 connected therein, said pipe 35 leading to any suitable recovery apparatus for recondensing the vapor.

The water jacket 4 serves two functions, namely to prevent the particles of ice adhering to the inner surface of the wall of the chamber 1 and, secondly, by maintaining the temperature of the wall of the chamber at substantially the freezing point, to cool the water passing through the water jacket. The water withdrawn through the water jacket is thus precooled for use, if desired, as a supply for the water nozzles.

While I have described the process as applicable to water it will be understood that the same process may be utilized in connection with the freezing of other liquids. Obviously it will be necessary where other liquids are frozen to regulate the temperature of the interior of the chamber 1, by controlling the wall temperature by the flow of liquid in the water jacket 4.

It will be also be understood that while I have shown a specific form of bringing the liquid refrigerant into contact with the water spray, other means of directly mixing the refrigerant with the water may be employed.

What I claim and desire to secure by Letters Patent is:—

1. The process of forming ice bodies from water which consists in bringing into direct contact with the water a quantity of light hydrocarbons insoluble in the water, said hydrocarbons being of a character which will not impart any odor, taste or deleterious effect to the ice bodies, and evaporating the hydrocarbons under a partial vacuum.

2. The process of forming ice bodies from water which consists in bringing into direct contact with the water a quantity of light hydrocarbons insoluble in the water, said hydrocarbons being of a character which will not impart any odor, taste or deleterious effect to the ice bodies, evaporating the hydrocarbons under a partial vacuum, and accumulating the ice bodies in an excess of water.

3. The process of forming ice bodies from water which consists in bringing into direct contact with the water a quantity of light hydrocarbons insoluble in the water, said hydrocarbons being of a character which will not impart any odor, taste or deleterious effect to the ice bodies, evaporating the hydrocarbons under a partial vacuum, accumulating the ice bodies in an excess of water, and withdrawing the ice bodies from the excess of water without raising the pressure.

4. The process of forming congealed bodies from a liquid which consists in bringing into direct contact with the liquid a quantity of hydrocarbon refrigerant, evaporating the hydrocarbon refrigerant under a partial vacuum, accumulating the congealed bodies in excess of the liquid, and withdrawing the congealed bodies from excess of the liquid while remaining under a partial vacuum.

5. The process of forming ice bodies which consists in supplying water and a hydrocarbon refrigerant through a plurality of adjacently arranged pairs of nozzles to a sealed container, the water being supplied in excess to form in the container a body of the liquid, withdrawing the vapor of the refrigerant, and withdrawing the ice bodies from the excess liquid.

6. The process of refrigerating a liquid which consists in supplying the liquid and the refrigerant through adjacently arranged pairs of spray nozzles to a sealed container, in which there is a subatmospheric pressure, said liquid being supplied in excess to provide a partial atmosphere of liquid vapor and to provide an accumulating body for the frozen liquid, externally cooling the container, exhausting the evaporated refrigerant, and passing the supply of liquid in an out-of-contact counter current in respect to the evacuated refrigerant.

7. The process of forming ice bodies which consists in supplying water and a hydrocarbon refrigerant through a plurality of adjacently arranged pairs of nozzles to a sealed container, withdrawing the vapor of the refrigerant through a heat exchanger, and passing the supply of water through the heat exchanger before entering said container.

SAMUEL C. CARNEY.